United States Patent
Hasegawa (10) Patent No.: US 11,964,518 B2
(45) Date of Patent: Apr. 23, 2024

(54) TIRE

(71) Applicant: BRIDGESTONE CORPORATION, Tokyo (JP)

(72) Inventor: Keiichi Hasegawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 454 days.

(21) Appl. No.: 17/289,334

(22) PCT Filed: Oct. 31, 2019

(86) PCT No.: PCT/JP2019/042932
§ 371 (c)(1),
(2) Date: Apr. 28, 2021

(87) PCT Pub. No.: WO2020/091018
PCT Pub. Date: May 7, 2020

(65) Prior Publication Data
US 2022/0258544 A1   Aug. 18, 2022

(30) Foreign Application Priority Data

Oct. 31, 2018  (JP) .................................. 2018-205131

(51) Int. Cl.
*B60C 15/06* (2006.01)
*B60C 15/00* (2006.01)
*B60C 15/04* (2006.01)

(52) U.S. Cl.
CPC .......... *B60C 15/04* (2013.01); *B60C 15/0054* (2013.01); *B60C 2015/0642* (2013.01); *B60C 2015/065* (2013.01); *B60C 2015/0678* (2013.01)

(58) Field of Classification Search
CPC . B60C 15/06; B60C 15/0603; B60C 15/0607; B60C 2015/061;
(Continued)

(56) References Cited

U.S. PATENT DOCUMENTS

| 2010/0319831 A1 | 12/2010 | Miyazono |
| 2015/0151591 A1 | 6/2015 | Tomitaka |
| 2016/0082785 A1 | 3/2016 | Sohn et al. |

FOREIGN PATENT DOCUMENTS

| CN | 101528485 A | 9/2009 |
| CN | 105437876 A | 3/2016 |

(Continued)

OTHER PUBLICATIONS

Machine Translation: JP-10035231-A, Hibino M, (Year: 2023).*

(Continued)

*Primary Examiner* — Kendra Ly
(74) *Attorney, Agent, or Firm* — Sughrue Mion, PLLC (57) ABSTRACT

The bead portion of the pneumatic tire includes a bead structure having a bead core composed of a bead cord, and an annular plate which extends to the tire circumferential direction and is formed of a resin material. The annular plate has a planar first annular ring portion extending to the tire circumferential direction and a second annular ring portion positioned outside the tire radial direction of the first annular portion and extending to the tire circumferential direction, the first annular portion is provided along the bead structure, and the second annular portion is further inclined to the outside in tire width direction of the first annular portion.

3 Claims, 8 Drawing Sheets

(58) Field of Classification Search
CPC .... B60C 2015/0617; B60C 2015/0621; B60C 2015/0625
See application file for complete search history.

(56) References Cited

FOREIGN PATENT DOCUMENTS

| | | | | |
|---|---|---|---|---|
| JP | 09-300921 A | 11/1997 | | |
| JP | 10-035231 A | 2/1998 | | |
| JP | 10035231 A | * 2/1998 | ............... | B60C 9/14 |
| JP | 2003-200718 A | 7/2003 | | |
| JP | 2007-320449 A | 12/2007 | | |
| JP | 2013-039851 A | 2/2013 | | |
| JP | 2014-151739 A | 8/2014 | | |
| JP | 2014151739 A | * 8/2014 | | |
| JP | 2014-234074 A | 12/2014 | | |
| JP | 2015-039970 A | 3/2015 | | |
| JP | 2015-105000 A | 6/2015 | | |

OTHER PUBLICATIONS

Machine Translation: JP-2014151739-A, Yoshida Y, (Year: 2023).*
International Search Report of PCT/JP2019/042932 dated Jan. 28, 2020 [PCT/ISA/210].
Extended European Search Report dated Jun. 28, 2022 from the European Patent Office in EP Application No. 19880462.7.

* cited by examiner

TIRE

CROSS REFERENCE TO RELATED APPLICATIONS

This application is a National Stage of International Application No. PCT/JP2019/042932 filed on Oct. 31, 2019, claiming priority based on Japanese Patent Application No. 2018-205131 filed on Oct. 31, 2018.

TECHNICAL FIELD

The present invention relates to a tire in which a resin-made annular plate is provided in a bead portion.

BACKGROUND ART

Conventionally, for the purpose of improving the steering stability of a vehicle, a tire in which a resin-made annular plate is provided in a bead portion is known (See Patent Literature 1.).

Specifically, an annular plate is provided along the tire circumferential direction between a bead structure containing a bead core and a bead filler (apex) and a folded portion of a carcass ply folded back to the outside of the tire width direction via the bead core.

CITATION LIST

Patent Literature

[PTL 1] Japanese Unexamined Patent Application Publication No. 2014-234074

SUMMARY OF INVENTION

In order to improve the steering stability by using the above-mentioned annular plate, it is important to fit the annular plate to the shape of the carcass ply. Since the carcass ply is curved along the shape of the bead portion to fall outside of the tire width direction, the annular plate must also be bent along the shape of the carcass ply.

When the annular plate is bent to the outside of the tire width direction, an extra length is generated in the circumferential direction of the annular plate at the outside part of the tire radial direction of the annular plate, and the annular plate is hardly fitted to the carcass ply.

In particular, the annular plate made of a resin is more difficult to deform than the rubber material in the vulcanizing process, so that such a problem is conspicuous. To solve this problem, tire's manufacturing process becomes complicated.

Accordingly, an object of the present invention is to provide a tire that achieves both improvement in ease of manufacture and steering stability while using a resin-made annular plate.

One aspect of the present invention is a tire including a tread portion in contact with a road surface, a tire side portion continuous to the tread portion and positioned inside in the tire radial direction of the tread portion, and a bead portion continues to the tire side portion and positioned inside in the tire radial direction of the tire side portion. The tire comprises a carcass ply forming a skeleton of the tire and the bead portion includes a bead structure having a bead core composed of a bead cord, and an annular plate extending to the tire circumferential direction and formed of a resin material. The annular plate includes a first annular portion that is planar and extends to the tire circumferential direction, and a second annular portion positioned outside in the tire radial direction of the first annular portion and extending to the tire circumferential direction. The first annular portion is provided along the bead structure and the second annular portion is further inclined to outside in a tire width direction than the first annular portion.

One aspect of the present invention is a tire including a tread portion in contact with a road surface, a tire side portion continuous to the tread portion and positioned inside in the tire radial direction of the tread portion, a bead portion continues to the tire side portion and positioned inside in the tire radial direction of the tire side portion. The tire includes a carcass ply forming the skeleton of the tire and the bead portion includes a bead structure having a bead core composed of a bead cord, and an annular plate extending to the tire circumferential direction and formed of a resin material. At least a part of the annular plate in tire radial direction expands or contracts in tire circumferential direction.

DESCRIPTION OF EMBODIMENTS

Embodiments will be described below with reference to the drawings. The same functions and configurations are denoted by the same or similar reference numerals, and descriptions thereof are omitted as appropriate.

(1) Overall Schematic Configuration of the Tire

Figure 1:
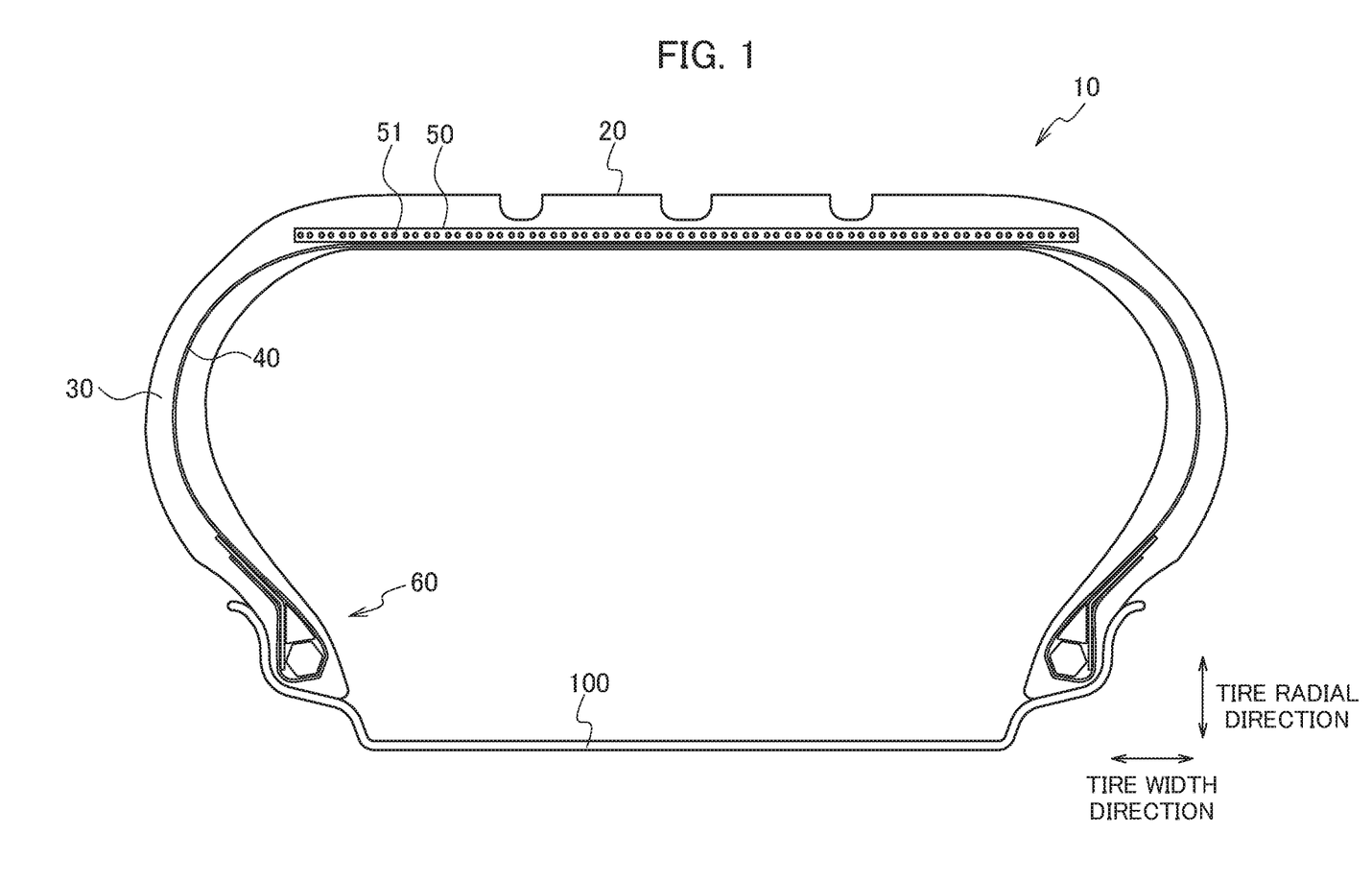
FIG. 1 is a cross-sectional view of a pneumatic tire 10.

FIG. 1 is a sectional view of the pneumatic tire 10 according to the present embodiment. Specifically, FIG. 1 is a cross-sectional view of the pneumatic tire 10 along tire width direction and tire radial direction. In FIG. 1, the sectional hatching is not shown (hereinafter the same).

As shown in FIG. 1, the pneumatic tire 10 includes a tread portion 20, a tire side portion 30, a carcass ply 40, a belt layer 50, and a bead portion 60.

The tread portion 20 is a part contacting with a road surface (unillustrated). On the tread portion 20, a pattern (unillustrated) corresponding to the use environment of the pneumatic tire 10 and the kind of a vehicle to be mounted is formed.

The tire side portion 30 continues to the tread portion 20 and is positioned inside in the tire radial direction of the tread portion 20. The tire side portion 30 is a region from the tire width direction outside end of the tread portion 20 to the upper end of the bead portion 60. The tire side portion 30 is sometimes referred to as a side wall or the like.

The carcass ply 40 forms a skeleton of the pneumatic tire 10. The carcass ply 40 has a radial structure in which carcass cords (unillustrated) arranged radially along the tire radial direction are covered with a rubber material. However, the present invention is not limited to a radial structure, and may be a bias structure in which the carcass cords are arranged so as to cross each other in the tire radial direction.

The carcass cord is not particularly limited, and can be formed of an organic fiber cord in the same manner as a tire for a standard passenger car.

The belt layer 50 is provided inside the tire radial direction of the tread portion 20. The belt layer 50 is a single-layer spiral belt having a reinforcing cord 51 and the reinforcing cord 51 is covered with a resin. However, the belt layer 50 is not limited to a single-layer spiral belt. For example, the belt layer 50 may be a two-layer interlaced belt covered with rubber.

As the resin for covering the reinforcing cord 51, a resin material having a higher tensile elastic modulus than that of a rubber material constituting the tire side portion 30 and a rubber material constituting the tread portion 20 are used. As the resin for covering the reinforcing cord 51, a thermoplastic resin having elasticity, a thermoplastic elastomer (TPE), a thermosetting resin or the like can be used. It is desirable to use a thermoplastic elastomer in consideration of elasticity in running and moldability in manufacturing.

The thermoplastic elastomer includes a polyolefin-based thermoplastic elastomer (TPO), a polystyrene-based thermoplastic elastomer (TPS), a polyamide-based thermoplastic elastomer (TPA), a polyurethane-based thermoplastic elastomer (TPU), a polyester-based thermoplastic elastomer (TPC), a dynamically crosslinked thermoplastic elastomer (TPV), etc.

Examples of the thermoplastic resin include polyurethane resin, polyolefin resin, vinyl chloride resin, polyimide resin, and the like. Further, as the thermoplastic resin material, for example, a material having a deflection temperature under load (At 0.45 MPa Load) specified in ISO 75-2 Or ASTM D648 of 78° C. or more, a tensile yield strength specified in JIS K7113 of 10 MPa or more, a tensile fracture elongation specified in JIS K7113 of 50% or more, and a Vicat softening temperature (method A) specified in JIS K7206 of 130° C. or more can be used.

The bead portion 60 continues to the tire side portion 30 and is positioned inside in the tire radial direction of tire side portion 30. The bead portion 60 is an annular shape extending to the tire circumferential direction.

The bead portion 60 is locked to a flange portion 110 (Not shown in FIG. 1, see FIG. 2) formed at the radially outside end of the rim wheel 100.

An inner liner (unillustrated) for preventing air (or a gas such as nitrogen) filled in an internal space of the pneumatic tire 10 assembled to the rim wheel 100 from leaking is stuck to the tire inner side surface of the pneumatic tire 10.

(2) Bead Portion Configuration

Figure 2:
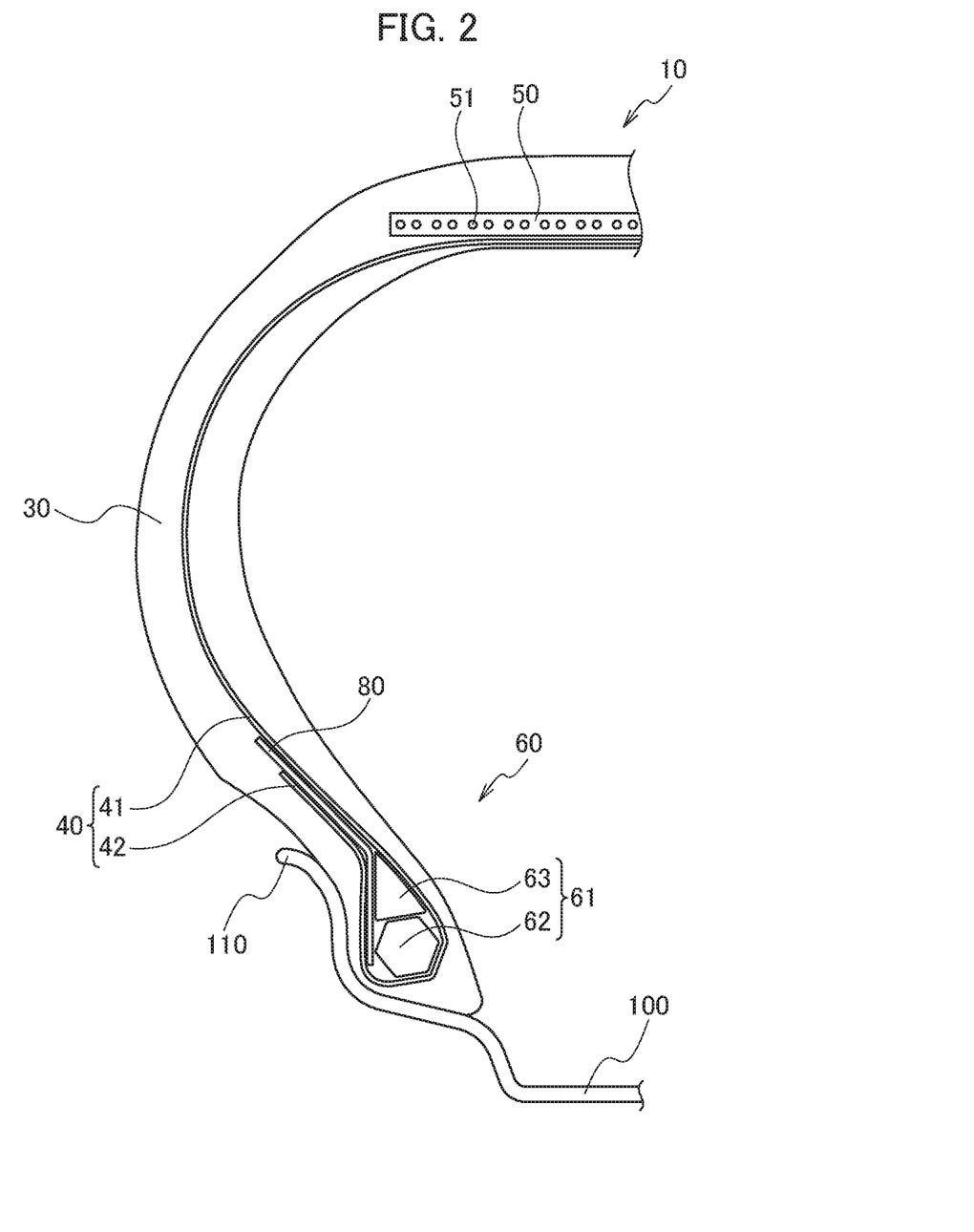
FIG. 2 is a partially enlarged sectional view of the pneumatic tire 10.

FIG. 2 is a partially enlarged sectional view of the pneumatic tire 10. Specifically, FIG. 2 is a partially enlarged cross-sectional view of pneumatic tire 10 including the bead portion 60 along the tire width direction and the tire radial direction.

As shown in FIG. 2, the bead portion 60 includes a bead structure 61 and an annular plate 80. The bead structure 61 has a bead core 62 and a bead filler 63.

The bead core 62 is composed of a bead cord (unillustrated) formed of a metal material (For example, steel.). Specifically, the bead core 62 is formed by twisting a plurality of bead cords.

The bead filler 63 is positioned outside of the bead core 62 in the tire radial direction. The bead filler 63 is formed of, for example, a rubber member harder than other parts.

The carcass ply 40 has a body portion 41 and a folded portion 42. The body portion 41 is provided over the tread portion 20, the tire side portion 30, and the bead portion 60, and is a portion until it is folded in the bead portion 60, specifically, a bead core 62.

The folded portion 42 is a portion continued to the body portion 41 and folded back to the outside of the tire width direction via the bead structure 61. The folded-back portion 42 is curved along the shape of the bead portion 60 so as to fall to the outside of the tire width direction.

The annular plate 80 is an annular plate extending into the tire circumferential direction. The annular plate 80 is bent along the shape of the carcass ply 40, specifically, the folded portion 42.

In this embodiment, the annular plate 80 is provided between the bead structure 61 and the folded portion 42. The annular plate 80 is provided so as to straddle the bead core 62 and the bead filler 63.

Further, in the present embodiment, the annular plate 80 extends to the outside of the tire radial direction beyond the folded portion 42. That is, the tire radial direction outer end of the annular plate 80 is positioned outside the tire radial direction than the outer end of the folded portion 42 in the tire radial direction.

The annular plate 80 is formed of a resin material. Specifically, the annular plate 80 is formed of the same resin material as that used for the belt layer 50. However, as long as the above-described resin material can be used for the belt layer 50, the resin materials used for the belt layer 50 and the annular plate 80 may be different.

(3) Shape Example of Annular Plate

Next, referring to FIGS. 3 to 8, the shape of the annular plate 80 and other shape examples of the annular plate will be described.

In order to fit the annular plate to the shape of the carcass ply 40 (folded portion 42), if a simple flat annular plate is bent outward in the tire width direction, an extra length is produced in the circumferential direction of the annular plate at outer portion of the tire radial direction of the annular plate. The annular plate according to the present embodiment can absorb such an excess length (hereinafter also referred to as "diameter difference") in the circumferential direction.

(3.1) Shape Example 1

Figure 3:
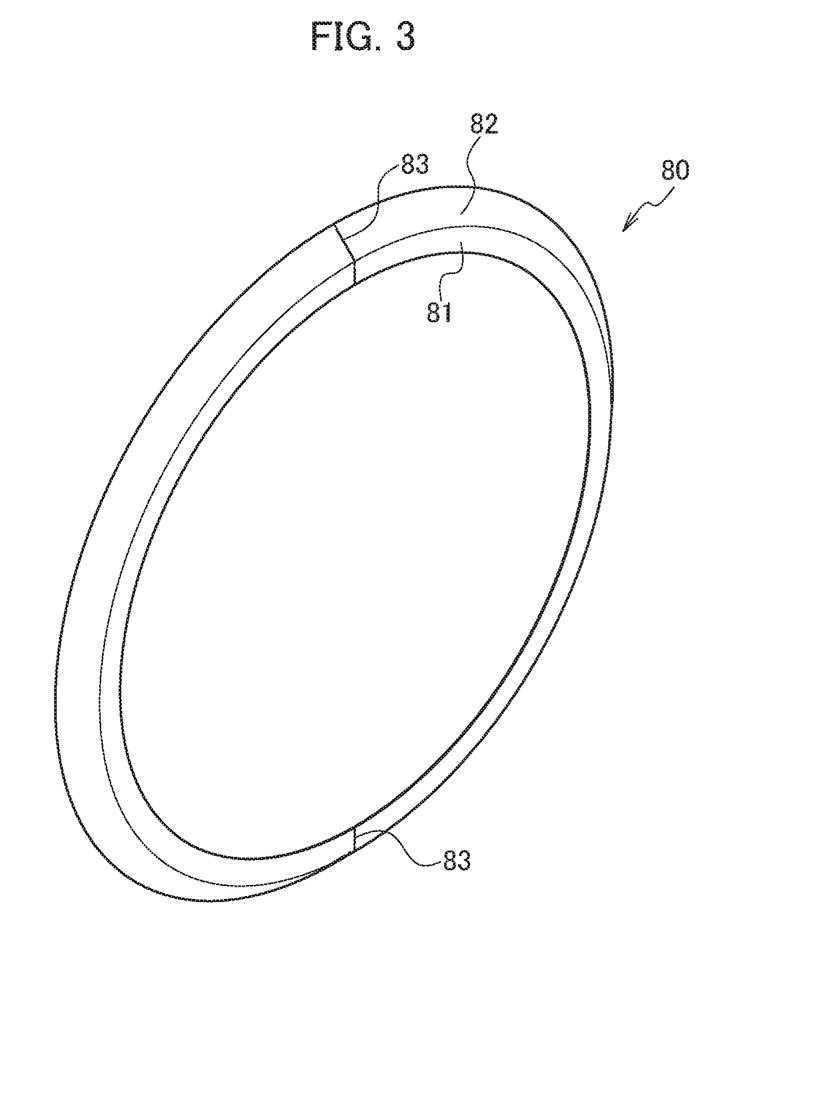
FIG. 3 is a sole perspective view of an annular plate 80.

FIG. 3 is a sole perspective view of the annular plate 80. As shown in FIG. 3, the annular plate 80 is annular extending to the tire circumferential direction and has a first annular portion 81 and a second annular portion 82.

The first annular portion 81 is a planar ring extending to the tire circumferential direction. The second annular portion 82 also extends to the tire circumferential direction. The second annular portion 82 is positioned outside in the tire radial direction of the first annular portion 81.

The annular plate 80 according to the present embodiment may be separable at a junction 83 before fitting to the carcass ply 40 to facilitate manufacture of the pneumatic tire 10.

The first annular portion 81 is provided along the bead structure 61 (See FIG. 2). The second annular portion 82 is inclined to the outside in the tire width direction than the first annular portion 81. That is, the annular plate 80 is not flat but has a three-dimensional shape in a state before fitting of the carcass ply 40.

As described above, if the outer portion in the tire radial direction of the annular plate which is a simple flat plate is bent, an excess length (diameter difference) is generated in the circumferential direction, but since the annular plate 80 is formed in a three-dimensional shape in which the second annular portion 82 is bent, such an excess length is not generated.

The thickness of the annular plate 80 can be appropriately changed in accordance with the type of resin material and required performance (Same for the other annular plates described below).

Figure 4:
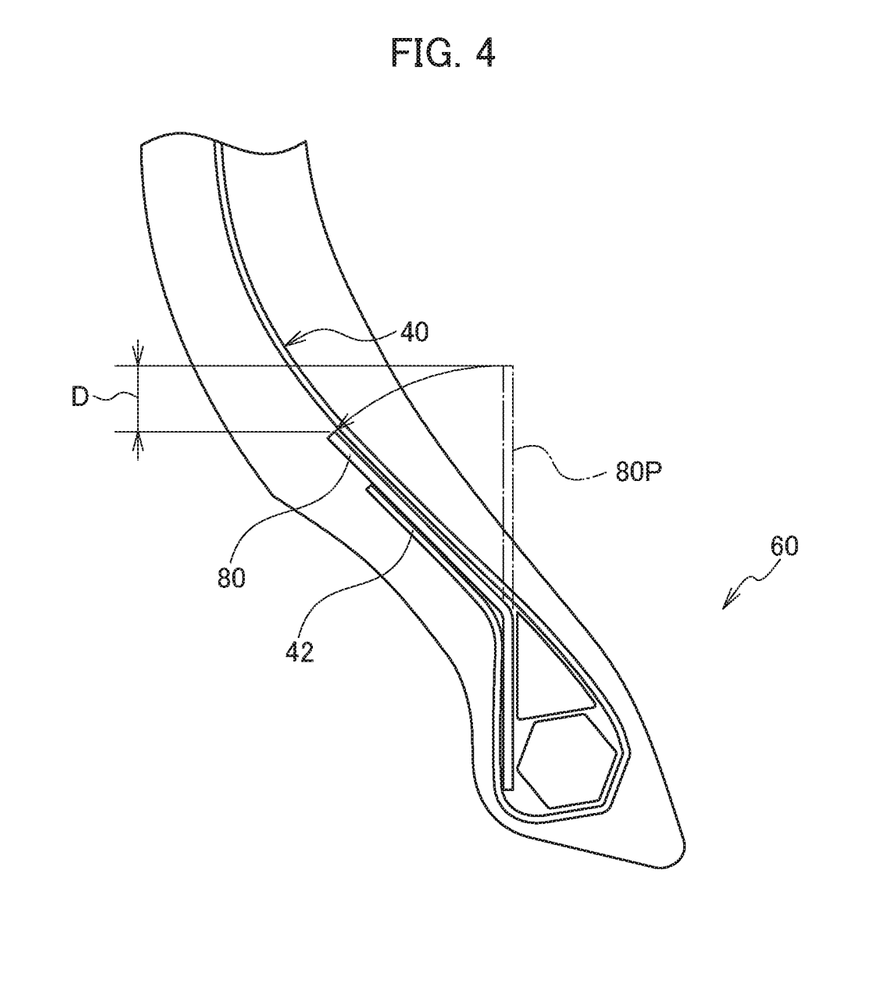
FIG. 4 is an explanatory view of a diameter difference D generated when the three-dimensional annular plate 80 and a flat annular plate 80 P are bent.

FIG. 4 is an explanatory view of a diameter difference D generated when a three-dimensional annular plate 80 and a flat annular plate 80 P are bent.

In FIG. 4, the annular plate 80 P of a flat plate is shown by an imaginary line. If the annular plate 80 P is bent to fit the shape of the carcass ply 40 (folded portion 42), a diameter difference D is generated between the diameter of the annular plate 80 P at outer end in the tire radial direction and the diameter at the bent position.

That is, if the annular plate 80 P is bent, the diameter is reduced by the diameter difference D at the bent position. Therefore, if the annular plate 80 P is bent, an extra length is generated in the circumferential direction of the annular plate 80 P at the outer portion in the tire radial direction of the annular plate 80 P. When such an excess length is generated, an air gap is formed with the carcass ply 40 (body portion 41 and folded portion 42), so that the annular plate 80 P is hardly fitted to the carcass ply 40.

Since the three-dimensional annular plate 80 is previously molded in such a shape that an excess length in the circumferential direction does not occur, fitting with the carcass ply 40 is good.

(3.2) Shape Example 2

Figure 5:
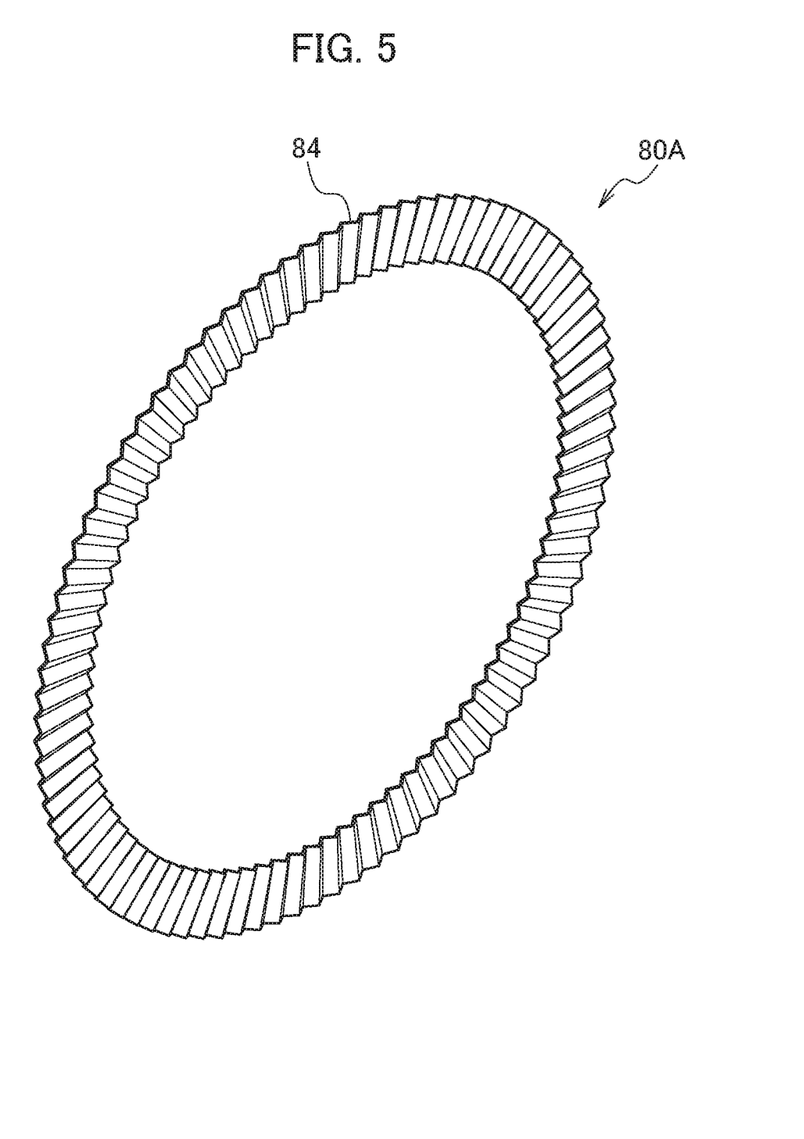
FIG. 5 is a sole perspective view of an annular plate 80 A.

FIG. 5 is a sole perspective view of the annular plate 80 A. As shown in FIG. 5, the annular plate 80 A has a wavy portion 84 that repeats an amplitude at tire width direction along tire circumferential direction.

Since the wavy portion 84 repeats the amplitude at the tire width direction, the annular plate 80 A can expand or contract in the circumferential direction of the annular plate 80 A, that is, in the tire circumferential direction. Thus, even if the carcass ply 40 (folded portion 42) is in a shape of falling down to the outside in the tire width direction, the annular plate 80 A can be easily fitted to the carcass ply 40.

In the present embodiment, the wavy portion 84 is formed over the entire area of the annular plate 80 A in the tire radial direction, but it is not necessarily required to have such a shape. That is, it is sufficient that the wavy portion 84 is formed at least in a part of the tire radial direction of the annular plate 80 A and can be expanded or contracted in the tire circumferential direction.

In the present embodiment, the wavy portion 84 has a zigzag wavy shape that is repeated along the tire circumferential direction, but a curved wavy shape may be repeated along the tire circumferential direction.

(3.3) Shape Example 3

Figure 6:
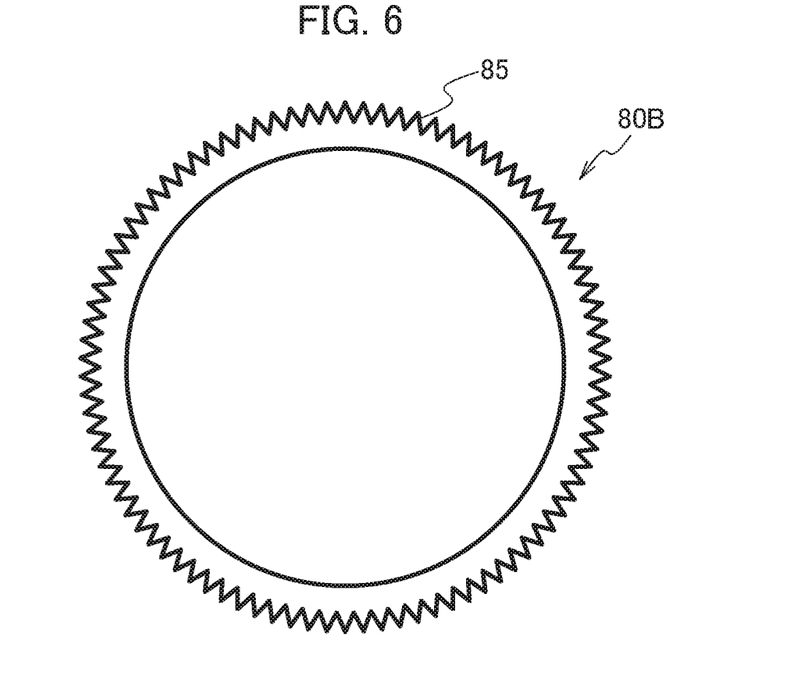
FIG. 6 is a sole perspective view of an annular plate 80 B.

FIG. 6 is a sole perspective view of the annular plate 80 B. As shown in FIG. 6, the annular plate 80 B has the concavo-convex portion 85 which repeat recesses (concave) and protrusions (convex) in the tire radial direction along the tire circumferential direction. The concavo-convex portion 85 is formed at the outer end of the tire radial direction of the annular plate 80 B.

In the present embodiment, the concavo-convex portion 85 has a zigzag shape with repeated fine tooth-like notches along with the tire circumferential direction.

Figure 7:
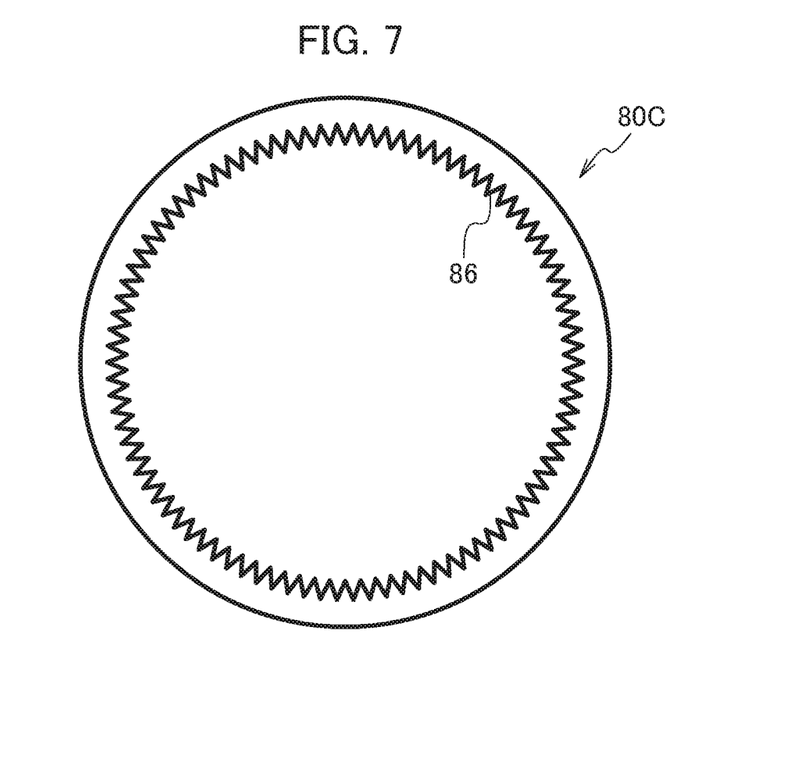
FIG. 7 is a sole perspective view of an annular plate 80 C.

FIG. 7 is a sole perspective view of the annular plate 80 C. The annular plate 80 C has a concavo-convex portion 86 which repeat recesses (concave) and protrusions (convex) in the tire radial direction along the tire circumferential direction. The concavo-convex portion 86 is formed on the inner end in the tire radial direction of the annular plate 80 C.

Like the annular plate 80 B or the annular plate 80 C, the concavo-convex portions may be formed at the outer end of the tire radial direction or at the inner end of the tire radial direction.

In the case of the annular plate 80 B, the diameter size of the annular plate 80 B is preferably determined with reference to the inner end in the tire radial direction of the annular plate 80 B on which the concavo-convex portion 85 is not formed. In the case of the annular plate 80 C, the diameter size of the annular plate 80 C is preferably determined with reference to the outer end in the tire radial direction of the annular plate 80 C on which the concavo-convex portion 86 is not formed.

That is, it is preferable that the diameter of the end portion on the side where the concavo-convex portion is not formed in the tire radial direction is matched with the diameter of the position of the carcass ply 40 with which the end portion contacts. As a result, at the end portion on the side where the concavo-convex portion is formed in the tire radial direction, the concavo-convex portion is expanded or contracted in the tire circumferential direction, and it becomes easy to fit the carcass ply 40.

The concavo-convex portion 85 and the concavo-convex portion 86 are substantially in a zigzag shape like teeth of a saw in which concave-convex portions are repeated, but the durability of the annular plate is improved by forming the concavo-convex portion in a round shape.

Figure 8:
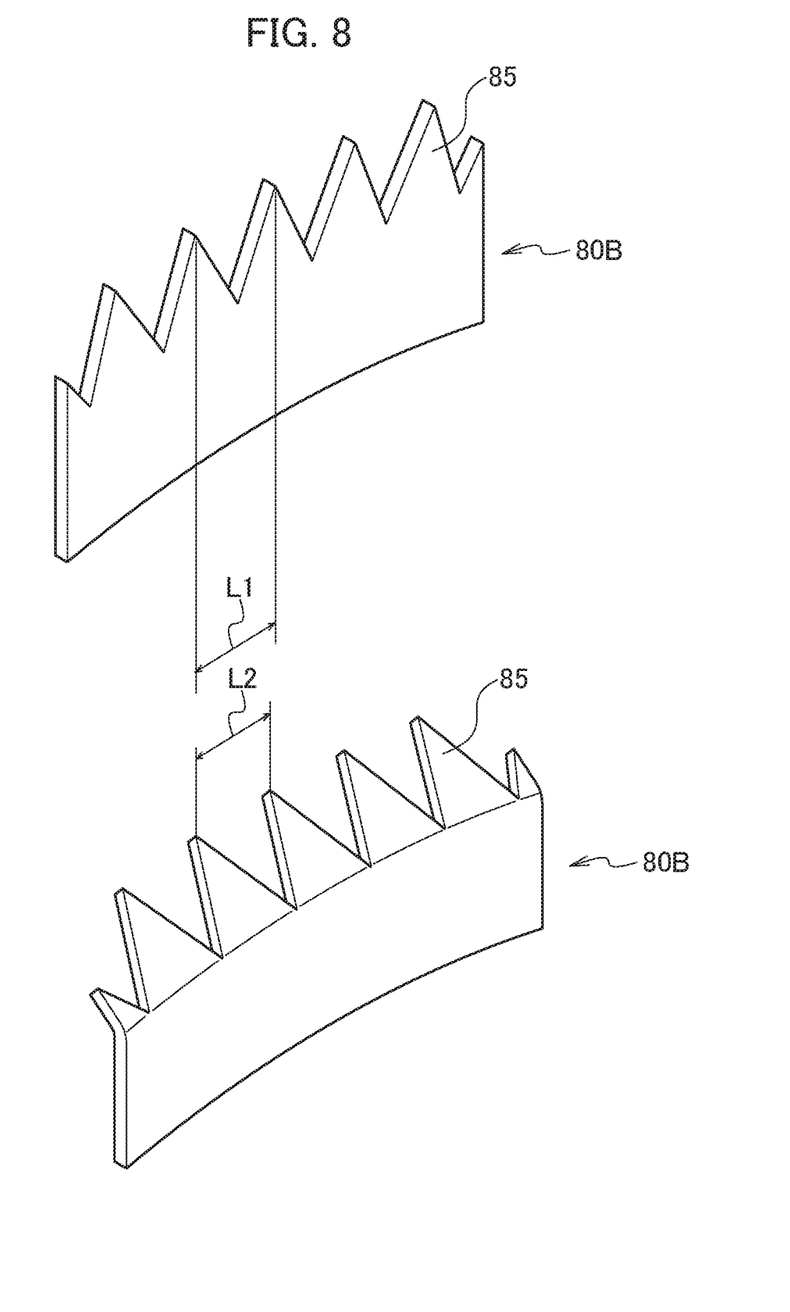
FIG. 8 is an explanatory view of the shape of a concavo-convex portion 85 formed in the annular plate 80 B.

FIG. 8 is an explanatory view of the shape of the concave-convex portion 85 formed in the annular plate 80 B. As shown in FIG. 8, before being bent along the carcass ply 40 (folded portion 42), the distance between adjacent convex portions (indentation) is L1.

When the concavo-convex portion 85 is bent along the carcass ply 40 (folded portion 42), an interval between adjacent convex portions (indentation) is changed to L2. Specifically, the interval is narrowed from L1 to L2.

Since the interval between such convex portions (indentation) changes, the concavo-convex portion 85 of the annular plate 80 B can be contracted in the tire circumferential direction.

Thus, even if the carcass ply 40 (folded portion 42) is in a shape of falling down to the outside of the tire width direction, the annular plate 80 B is easily fitted to the carcass ply 40.

(4) Function and Effects

According to the embodiment described above, the following effects can be obtained. Specifically, the annular plate 80 provided on the pneumatic tire 10 is not flat but has a three-dimensional shape in a state before fitting of the carcass ply 40. More specifically, the first annular portion 81 is provided along the bead structure 61, and the second annular portion 82 positioned outside in the tire radial direction of the first annular portion 81 is further inclined to the outside in the tire width direction than the first annular portion 81.

Therefore, even when the annular plate 80 is fitted along the shape of the carcass ply 40, an extra length is not generated in the circumferential direction of the annular plate 80 at outer side portion in the tire radial direction of the annular plate 80.

This may facilitate the manufacture of pneumatic tire 10. In addition, the use of the resin annular plate 80 can improve the steering stability of a vehicle (automobile) to which the pneumatic tire 10 is mounted. That is, according to the pneumatic tire 10, while the annular plate 80 made of resin is used, both the ease of manufacture and the improvement in steering stability can be made simultaneously.

As described above, in the case of an annular plate manufactured by cutting out a sheet-like resin member, since the circumferential length must be different at outside in the radial direction of the annular plate at the time of manufacturing the pneumatic tire 10, it is difficult to provide the annular plate at a desired position and orientation.

In particular, in the case of an annular plate made of a resin, it is difficult to deform even when vulcanized compared with a rubber material, and the degree of freedom in shape is low. The annular plate 80 can solve such a problem.

Also, in this embodiment, at least a part in tire radial direction of the annular plates, such as the annular plates 80 A, 80 B and 80 C, can be expanded or contracted in tire circumferential direction.

Specifically, the wavy portion 84 of the resin-made annular plate 80 A, the concavo-convex portion 85 of the annular plate 80 B, and the concavo-convex portion 86 of the annular plate 80 C have flexibility, and the annular plate can be expanded or contracted in tire circumferential direction.

Therefore, even if the carcass ply 40 (folded portion 42) is in a shape of falling down to the outside in the tire width direction, the annular plate is easily fitted to the carcass ply 40. Thus, both the ease of manufacture of the pneumatic tire 10 and the improvement of steering stability can be made while using the resin annular plate.

In this embodiment, the annular plate 80 (and annular plates 80 A, 80 B, 80 C) is provided between the bead structure 61 and the folded portion 42 of the carcass ply 40. Therefore, the annular plate 80 can be brought into close contact with the bead structure 61 from the outside in the tire width direction. Thus, the rigidity of the bead portion 60 is easily adjusted, and the steering stability is easily improved.

(5) Other Embodiments

Although the contents of the present invention have been described above with reference to the examples, it will be obvious to those skilled in the art that the present invention is not limited to these descriptions and that various modifications and improvements are possible.

Figure 9:
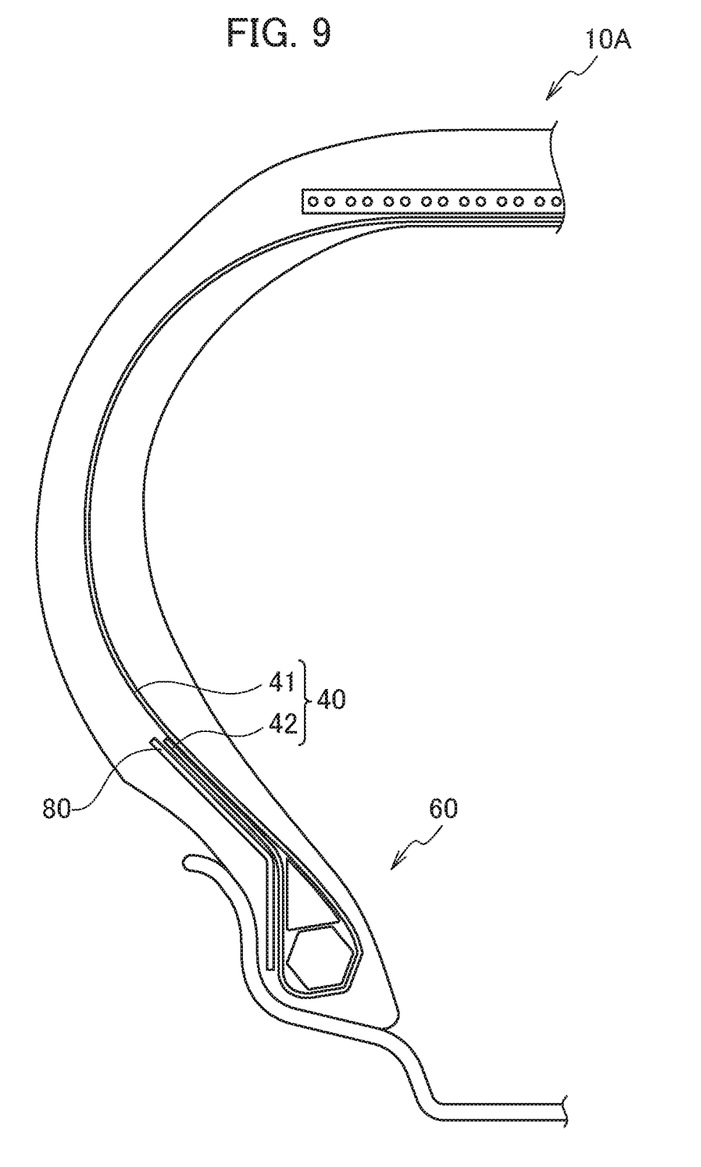
FIG. 9 is a partially enlarged cross-sectional view of a pneumatic tire 10 A according to a modified example.

For example, the position where the annular plate 80 is provided may be changed as follows. FIG. 9 is a partially enlarged cross-sectional view of the pneumatic tire 10 A according to the modified example. Specifically, FIG. 9 is a partially enlarged cross-sectional view of pneumatic tire 10 A, including the bead portion 60 along the tire width direction and the tire radial direction.

As shown in FIG. 9, in the pneumatic tire 10 A, the annular plate 80 is provided outside the tire width direction of the folded portion 42 of the carcass ply 40.

That is, the annular plate 80 may be provided between the bead structure 61 and the folded portion 42 of the carcass ply 40, or may be provided outside of the tire width direction of the folded portion 42 of the carcass ply 40.

While embodiments of the invention have been described as above, it should not be understood that the statements and drawings which form part of this disclosure are intended to limit the invention. Various alternative embodiments, examples and operating techniques will become apparent to those skilled in the art from this disclosure.

REFERENCE SIGNS LIST 10, 10 A Pneumatic tire
20 Tread portion
30 Tire side portion
40 Carcass ply
41 Body portion
42 Folded portion
50 Belt layer
51 Reinforcement cord
60 Bead portion
61 Bead structure
62 Bead Core
63 Bead filler
80, 80 A, 80 B, 80 C, 80 P Annular plate
81 First annular portion
82 second annular portion
83 Junction
84 Wavy portion
85, 86 Concavo-convex portions
100 Rim wheel
110 Flange portion

The invention claimed is:

1. A tire comprising:
a tread portion in contact with a road surface;
a tire side portion continuous to the tread portion and positioned inside in the tire radial direction of the tread portion; and
a bead portion continues to the tire side portion and positioned inside in the tire radial direction of the tire side portion,
wherein the tire comprises a carcass ply forming the skeleton of the tire and
the bead portion comprises:
a bead structure having a bead core composed of a bead cord; and
an annular plate extending to the tire circumferential direction and formed of a resin material, wherein
at least a part of the annular plate in tire radial direction expands or contracts in tire circumferential direction; and
the annular plate has a wavy portion that repeats an amplitude at tire width direction along the tire circumferential direction.

2. A tire comprising:
a tread portion in contact with a road surface;
a tire side portion continuous to the tread portion and positioned inside in the tire radial direction of the tread portion; and
a bead portion continues to the tire side portion and positioned inside in the tire radial direction of the tire side portion,
wherein the tire comprises a carcass ply forming the skeleton of the tire and
the bead portion comprises:
a bead structure having a bead core composed of a bead cord; and an annular plate extending to the tire circumferential direction and formed of a resin material, wherein at least a part of the annular plate in tire radial direction expands or contracts in tire circumferential direction;

the annular plate has a concavo-convex portion that repeats recesses and protrusions at the tire radial direction along the tire circumferential direction, and the concavo-convex portion is formed at an outer end in the tire radial direction of the annular plate.

3. A tire comprising:

a tread portion in contact with a road surface;

a tire side portion continuous to the tread portion and positioned inside in the tire radial direction of the tread portion; and a bead portion continues to the tire side portion and positioned inside in the tire radial direction of the tire side portion, wherein the tire comprises a carcass ply forming the skeleton of the tire and the bead portion comprises:

a bead structure having a bead core composed of a bead cord; and an annular plate extending to the tire circumferential direction and formed of a resin material, wherein at least a part of the annular plate in tire radial direction expands or contracts in tire circumferential direction;

the annular plate has a concavo-convex portion that repeats recesses and protrusions at the tire radial direction along the tire circumferential direction, and the concavo-convex portion is formed at an inner end in the tire radial direction of the annular plate.

\* \* \* \* \*